United States Patent [19]

Pierce

[11] 4,346,622

[45] Aug. 31, 1982

[54] FOUR SPEED TRANSAXLE WITH MID-POSITION TRANSFER DRIVE

[75] Inventor: Stanley L. Pierce, Walled Lake, Mich.

[73] Assignee: Ford Motor Company, Dearborn, Mich.

[21] Appl. No.: 148,431

[22] Filed: May 9, 1980

[51] Int. Cl.³ .................. F16H 47/08; F16H 37/08; F16H 37/00

[52] U.S. Cl. ............................. 74/688; 74/695; 74/700; 74/740; 74/762

[58] Field of Search ............. 74/688, 762, 740, 763, 74/677, 694, 695, 700, 701, 758, 759

[56] References Cited

U.S. PATENT DOCUMENTS

| | | | |
|---|---|---|---|
| 3,090,256 | 5/1963 | Hause | 74/688 X |
| 3,158,040 | 11/1964 | Moore | 74/759 X |
| 3,246,541 | 4/1966 | General | 74/677 |
| 3,270,585 | 9/1966 | Livezey | 74/677 |
| 3,300,001 | 1/1967 | Stockton | 74/763 |
| 3,314,307 | 4/1967 | Egbert | 74/688 |
| 3,446,094 | 5/1969 | Ohno et al. | 74/701 |
| 3,446,905 | 5/1969 | Bookout | 74/695 |
| 3,455,185 | 7/1969 | Ohno | 74/688 |
| 3,482,469 | 12/1969 | Mori | 74/759 X |
| 3,494,223 | 2/1970 | Mori | 74/688 |
| 3,505,904 | 4/1970 | Williams, Jr. | 74/694 X |
| 3,577,805 | 5/1971 | Ohno et al. | 74/695 |
| 3,620,100 | 11/1971 | Chana | 74/759 X |
| 3,701,623 | 10/1972 | Mori et al. | 74/763 X |
| 4,056,986 | 11/1977 | Hobbs | 74/701 X |
| 4,224,837 | 9/1980 | Croswhite | 74/763 |
| 4,242,924 | 1/1981 | Melhorn et al. | 74/759 |
| 4,271,721 | 6/1981 | Yamamori et al. | 74/695 |

FOREIGN PATENT DOCUMENTS

| | | | |
|---|---|---|---|
| 503307 | 1/1929 | Fed. Rep. of Germany | 74/314 |
| 486898 | 11/1929 | Fed. Rep. of Germany | 74/314 |
| 1750759 | 3/1978 | Fed. Rep. of Germany | 74/695 |
| 2743583 | 4/1979 | Fed. Rep. of Germany | 74/762 |
| 2830543 | 1/1980 | Fed. Rep. of Germany | 74/677 |

*Primary Examiner*—Leslie Braun
*Attorney, Agent, or Firm*—Donald J. Harrington; Keith L. Zerschling

[57] ABSTRACT

A transaxle for use in a vehicle having an engine mounted transversely with respect to the center plane of the vehicle comprising a compound planetary gear assembly mounted on the axis of the crankshaft for the engine, clutch and brake structure arranged in a strategic fashion to provide a minimum axial dimension for the transaxle, a final drive gear and differential mechanism mounted for rotation about an axis laterally spaced from and parallel to the engine axis, and a chain drive mechanism disposed intermediate the planetary gear assembly and the engine for effecting a driving connection between the driveshaft and the output gear element of the gear assembly whereby the outside dimensions of the transaxle permit packaging of the transaxle in an engine compartment with the engine axis disposed transversely and the driveshafts for the vehicle traction wheels may be positioned to effect a minimum angular displacement with respect to the axis of the differential.

7 Claims, 4 Drawing Figures

| Ratio \ Control Ele. | B1 | B2 | C1 | C2 | C3 | OWC | Gear Ratio | |
|---|---|---|---|---|---|---|---|---|
| 1st M/D | | × | | × | | × | (R/52) (AR) | 2.76 (AR)* |
| 2nd | × | | | × | | | $\dfrac{R(51+52)}{52(51+R)}$ (AR) | 1.52 (AR) |
| 3rd | | | × | × | | | 1.0 (AR) | 1.00 (AR) |
| 4th | × | | | | × | | $\dfrac{R}{51+R}$ (AR) | .70 (AR) |
| Rev. | | × | × | | | | −R/51 (AR) | −2.37 (AR) |

*(AR) = Axle Ratio = (1 + Ra/Sa)

FOUR SPEED TRANSAXLE WITH MID-POSITION TRANSFER DRIVE

GENERAL DESCRIPTION OF THE INVENTION

My invention comprises improvements in a multiple ratio automatic transmission of the kind shown in U.S. Pat. Nos. 3,314,307; 3,300,001; and 3,455,185. These patents show that it is known in the art to use a compound planetary gear unit of the so-called Ravagineaux design wherein provision is made for clutching an engine driven shaft or a turbine shaft of a hydrokinetic torque converter to the carrier of the planetary gear unit, the carrier having journalled thereon two sets of planet pinions. The pinions of one set are long and the pinions of the other set are short. A single ring gear for the planetary gear unit serves as a torque output gear element. The torque input elements during operation in low speed ratio and direct drive ratio are paired sun gears, one sun gear engaging one set of planet pinions and the other sun gear engaging the other set of planet pinions, the planet pinions engaging also each other. U.S. Pat. No. 3,314,307, in addition, teaches that it is known to provide a direct driving connection between the carrier of the planetary gear unit and the engine driven shaft or the shaft driven by the turbine of the hydrokinetic torque converter.

The improvements of my invention, unlike the teachings of the prior art, relate to a special relationship of the elements of the gearing with the clutches and brakes that control the speed ratios of the gearing to provide a minimum axial length for the clutches and the planetary gearing. The clutches and brakes are located in radial stacked relationship, one with respect to the other, between the output gear element of the gearing and the engine. The clutch for effecting an overdrive ratio is disposed on the opposite side of the gearing in radial disposition with respect to an overrunning coupling and a friction brake used to establish a reaction point during low speed forward drive operation and reverse drive operation.

The output element of the gearing is connected by means of a chain drive located on the side of the gearing closest to the engine, the chain drive providing a driving connection between final drive gearing and a differential and axle assembly mounted for rotation about a principal axis laterally spaced from and parallel to the engine axis. The location of the chain drive in the final drive gearing is arranged so that the output shafts for powering the traction wheels for the vehicle may be connected to the driveshaft through universal joints having a constant velocity characteristic without the necessity for mounting the driveshafts at a large angle relative to the axis of the differential assembly. If desired, the chain drive, in addition to providing a torque transfer, may be arranged to effect either a small speed reduction or a slight overdrive ratio in the driveline depending upon the overall ratio that is desired for any particular vehicle installation.

In a preferred embodiment of my invention a hydrokinetic torque converter is located within a common housing with the clutches and the brake that are used during operation in the forward driving ratios. The final drive gearing and the differential and driveshaft assembly of this preferred embodiment also are located in a common housing with the converter and the clutches and the brake at a location spaced laterally from the axis of the converter.

PARTICULAR DESCRIPTION OF THE INVENTION

Figures 1, 2:
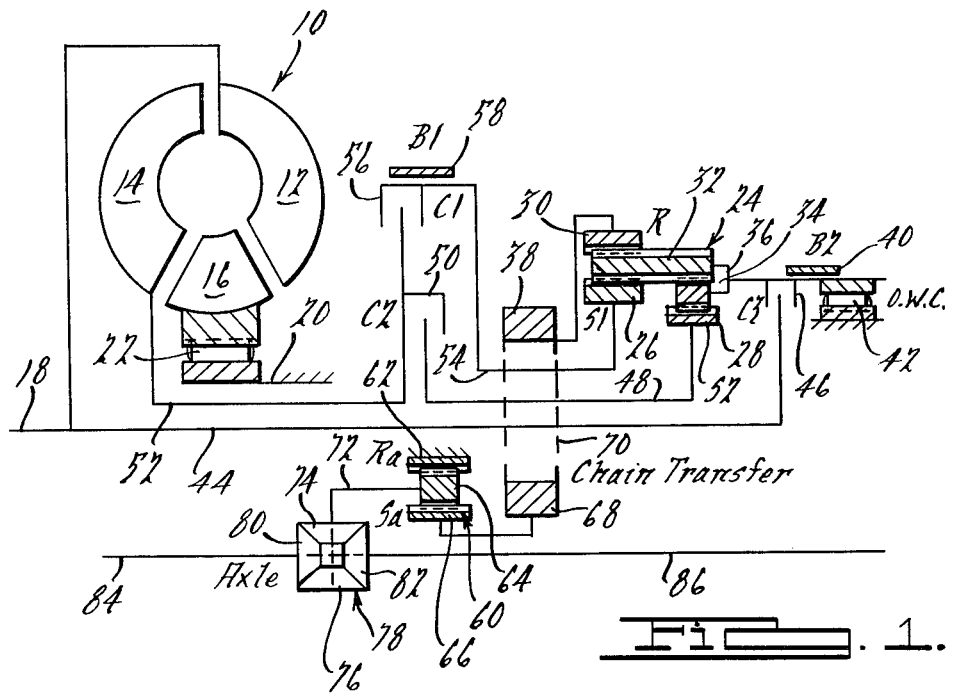
FIG. 1 shows in schematic form the torque delivery gear elements and the hydrokinetic torque converter as well as the final drive gearing and the differential and axle assembly for my invention.
FIG. 2 is a chart that shows the engagement and release pattern for the clutches and brakes during ratio changes of the gearing shown schematically in FIG. 1.

In FIG. 1 reference numeral 10 designates generally a hydrokinetic torque converter having a bladed impeller 12, a bladed turbine 14 and a bladed stator 16 arranged in toroidal fluid flow relationship in known fashion. The impeller 12 is connected drivably to engine crankshaft 18 and the stator 16 is mounted on a stationary stator sleeve shaft 20 and anchored thereto against rotation in one direction by an overrunning brake 22.

A compound planetary gear unit is shown at 24. It includes a large sun gear 26, a small sun gear 28, an output ring gear 30 and two sets of planet pinions, one set having long pinions 32 and the other set having short pinions 34. A common carrier for the pinion sets is shown at 36.

Ring gear 30 is connected to power output drive sprocket 38 located between the converter 10 and the gearing 24. The carrier 36 is adapted to be braked by friction brake band 40 during operation in reverse drive as well as operation in a low speed ratio when engine braking is desired. During forward drive in the low speed gear ratio the carrier 36 is braked by an overrunning coupling 42 which transmits torque in one direction to the stationary transmission housing.

Crankshaft 18 is connected by means of the central torque delivery shaft 44 to the carrier 36 through a selectively engageable friction clutch 46. Clutch 46 is applied during operation in the third speed ratio direct drive range and during operation in the fourth overdrive speed ratio. The carrier acts as a torque input element of the gearing during operation in each of these speed ratios.

Sun gear 28 is connected through sleeve shaft 48 and through selectively engageable friction clutch 50 to turbine sleeve shaft 52, the latter being connected to the turbine 14. Clutch 50 is applied during operation in the first, second and third forward driving speed ratios.

Sun gear 26 is connected through sleeve shaft 54 and through selectively engageable friction clutch 56 to the turbine shaft 52. Clutch 56 is applied during operation in reverse drive. Sleeve shaft 54 surrounds sleeve shaft 48 which, in turn, as explained earlier, surrounds the central torque delivery shaft 44.

Clutch 56 comprises a drum about which is positioned brake band 58, which is applied to anchor the sun gear 26 during operation in the second speed ratio and the fourth overdrive ratio at which time sun gear 26 acts as a torque reaction element.

A final drive gear 60 includes a stationary ring gear 62, planet pinions 64 and sun gear 66, the latter being connected to driven sprocket 68. Drive sprocket 38 is connected to driven sprocket 68 through a drive chain schematically illustrated in FIG. 1 at 70. Pinions 64 are supported on carrier 72 which serves as a torque input element for the differential pinions 74 and 76 of differential 78. Side gears 80 and 82 of the differential 78 are connected, respectively, to drive shafts 84 and 86.

The clutch and brake engagement and release pattern described with reference to FIG. 1 in the preceding paragraphs has been summarized in the table of FIG. 2. In FIG. 2 the clutch and brake elements are designated by reference characters $C_1$, $C_2$, $C_3$ and $B_1$ and $B_2$. These symbols also have been applied to the schematic diagram of FIG. 1 to provide a better understanding of the mode of operation of the transaxle.

Figure 3A:
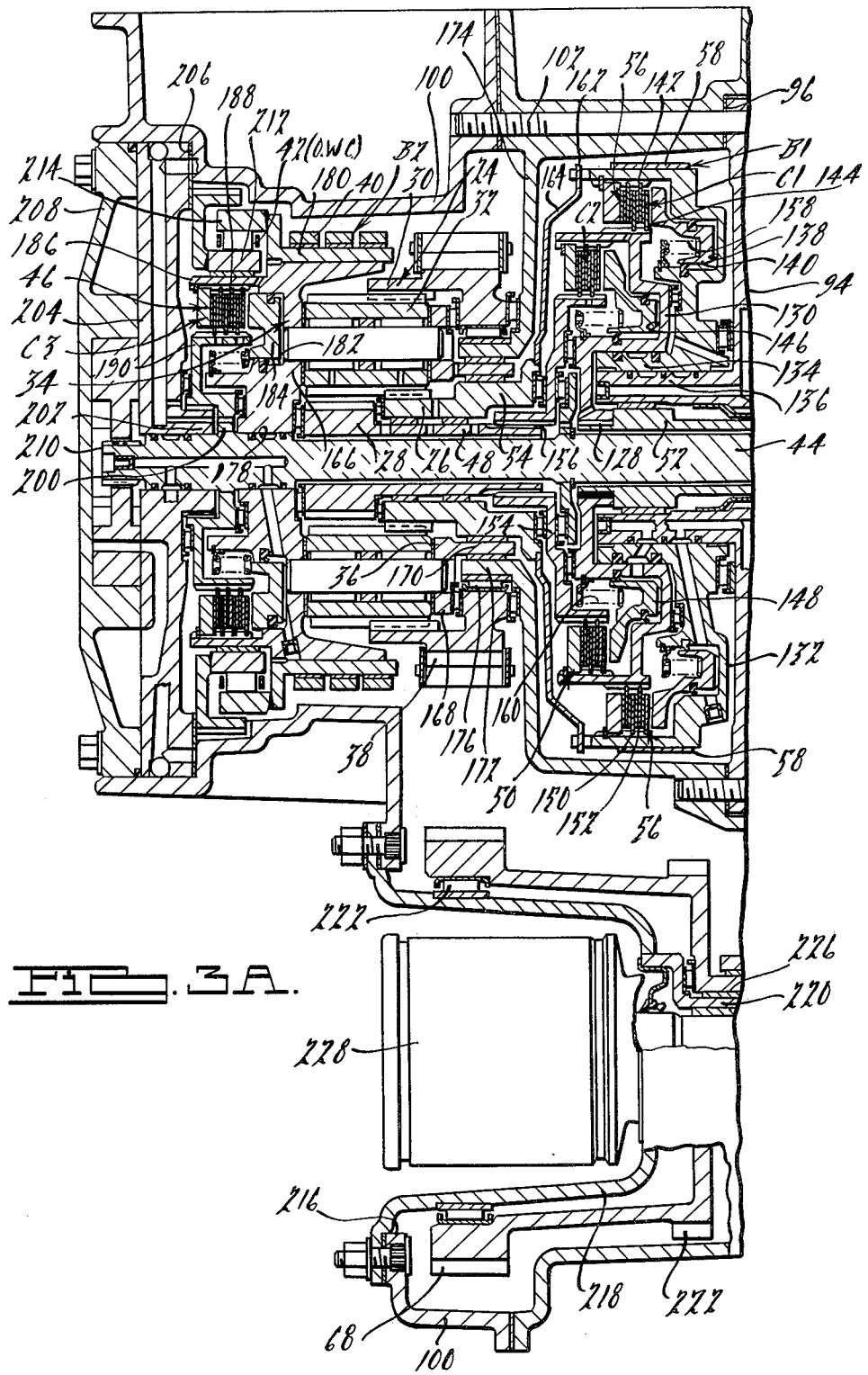
FIG. 3A and FIG. 3B together show in cross section the overall assembly of a preferred embodiment of my invention.
Figure 3B:
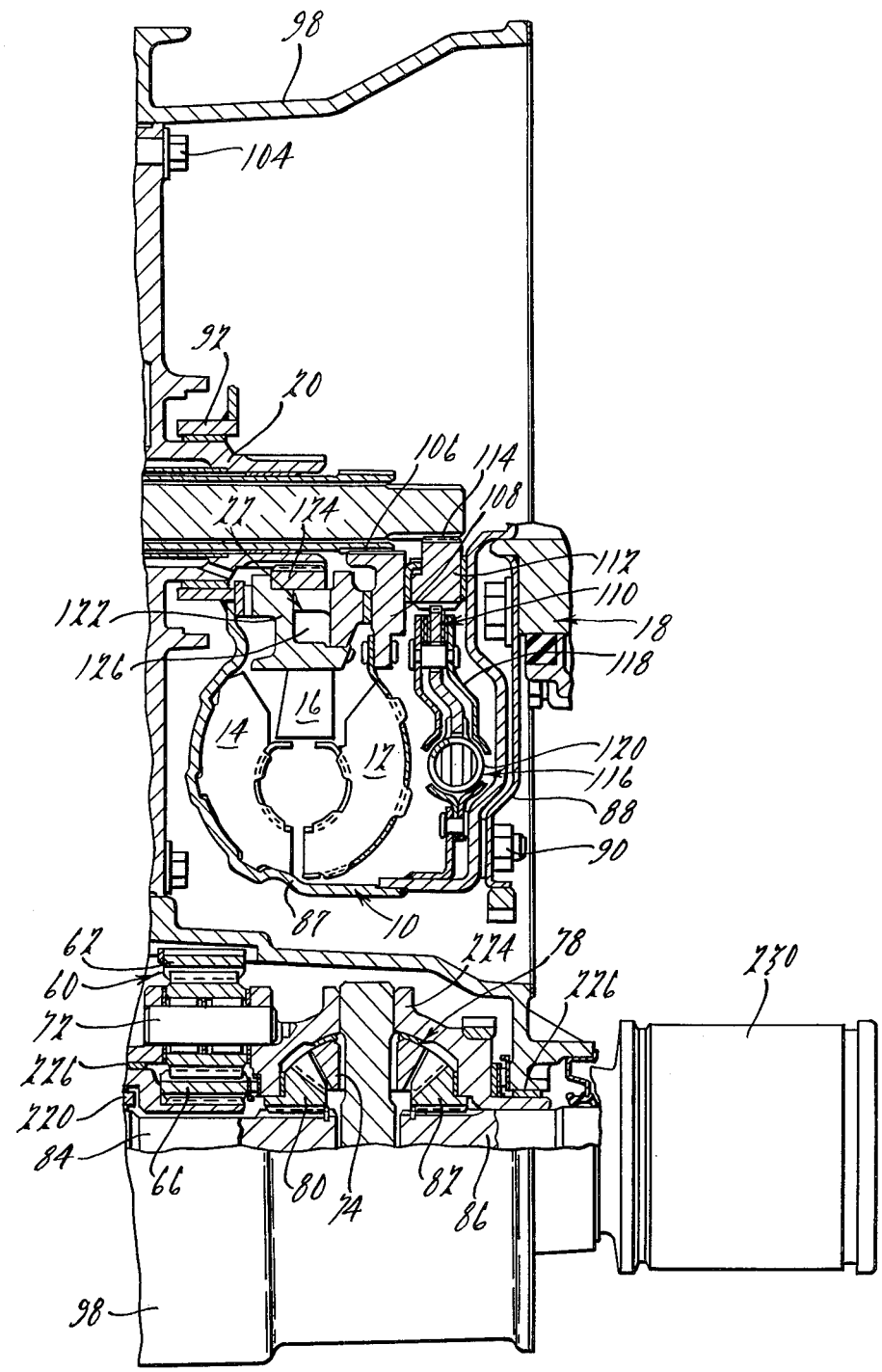

A preferred embodiment of the transaxle illustrated schematically in FIG. 1 is shown in FIGS. 3A and 3B. In FIG. 3B the housing for the torque converter 10 is shown at 87. It is connected to the crankshaft 18 by drive plate 88. The drive plate 88 is secured at its margin to impeller at 90 by means of bolts or the like.

The hub 92 of the impeller housing 86 is journalled on stationary sleeve shaft 20, which forms a part of transverse wall 94. The margin of the wall 94 is secured to shoulder 96 formed in transmission housing portion 98, the right hand margin of which is bolted or otherwise secured to the engine block of the internal combustion engine. Housing portion 100 encloses planetary gear unit 24 and it is secured at its right hand margin to the left hand margin of the housing portion 98 as shown at 102. A bolt 104 extends through a bolt opening formed in the housing portion 98 to a matching threaded opening in the housing portion 100 thereby holding support wall 94 and housing portions 98 and 100 in a rigid assembly.

The right hand end of turbine sleeve shaft 52 is splined at 106 to the hub 108 of bladed turbine 12. A drive disc 110 connects the outer periphery of the impeller housing 86 to impeller hub 112, which is splined at 114 to the centrally disposed torque delivery shaft 44. Drive disc 110 is connected to the housing 86 through a spring cushion or damper assembly 116, which may be of a conventional design. The drive disc 110 includes as part of its assembly side plates 118, which are connected to the central drive disc through a series of tangentially disposed compression springs 120.

Stator 16 includes stator hub 122 which is supported by stator hub 124, which in turn forms the inner race for the overrunning coupling 22 The outer race for coupling 22 is carried by the hub 122, as shown at 126.

Turbine shaft 52 is splined at 128 to clutch member 130. Clutch member 132 has a hub 134 that is journalled on stationary sleeve 136 which forms a part of the wall 94.

Annular cylinder 138 is formed in the clutch member 132, and an annular piston 140 is received in the cylinder 138 to define a clutch pressure working chamber. Member 132 carries externally splined clutch discs 142 arranged in alternating fashion with respect to internally splined clutch discs 144 which are carried by an externally splined portion of a clutch member 130. When the annular cylinder 138 is pressurized, the friction discs 142 and 144 are engaged thereby establishing a driving connection between clutch member 132 and clutch member 130, the latter being connected to turbine sleeve shaft 52 as explained earlier.

Clutch 50 is defined, in part, by the previously described clutch member 130. An annular cylinder 146 is defined by the clutch member 130 and it has received therein an annular clutch servo piston 148. The periphery of clutch member 130 is in turn splined to carry externally splined clutch discs 150 which are arranged in registry with internally splined clutch discs 152 carried by companion clutch element 154, which is splined as shown at 156 to sun gear sleeve shaft 48.

When the clutch 50 is applied upon distribution of working pressure to cylinder 146 a direct connection is established through clutch 50 between turbine shaft 52 and sun gear shaft 48. The pistons 140 and 148 normally are urged to a clutch release position by clutch release springs 158 and 160, respectively.

Brake band 58, which is applied during operation in the second speed ratio and the overdrive ratio as explained earlier, surrounds the external drum defined by member 132. Brake band 58 can be applied and released by a suitable fluid pressure operated servo in known fashion. Member 132 is connected at its periphery as shown at 162, to drive plate 164 which is connected at its hub to sun gear sleeve shaft 54.

Planetary gear unit 24 is a compound gear unit that includes carrier 34 with two side sections 166 and 168, which provide end bearing supports. Section 168 has a bearing ring 170 journalled on annular ring 172 formed on bearing wall 174, which is a part of the housing 98. Ring gear 30 and driving sprocket 38 also are journalled on the ring 172, a suitable needle bearing assembly 176 being provided for this purpose. The carrier section 166 is supported rotatably on the left hand end of central shaft 44 as shown at 178. Section 166 also forms at its radially outward periphery a brake drum 180 about which the brake band 40 is positioned. In the particular embodiment shown the brake band 40 is a multiple wrap band.

Section 166 also defines an annular cylinder 182 for the previously described clutch 36. A clutch piston 184 is situated in the cylinder 182, thus making it unnecessary to provide a separate clutch drum and effecting, partly for this reason, a maximum economy of space.

An internally splined annular extension 186 on the section 166 carries externally splined clutch discs 188 which are arranged in alternating registry with internally splined clutch discs carried by clutch element 190, which is welded or otherwise secured fast to the torque delivery shaft 44 as shown at 200. Working pressure present in the annular cylinder 182 will effect a connection through the clutch 46 between shaft 44 and carrier 34. Clutch element 190 is journalled on annular extension 202 formed on end wall 204 which is secured to an internal shoulder 206 in the housing portion 100. Pump housing 208 is bolted to the wall 204. It houses a positive displacement pump generally indicated by reference character 210, which supplies fluid pressure for actuating the clutches and brakes for the transmission.

Carrier section 166 is supported also by bearing ring 212 which is fixed to the housing 100. Annular ring 212 also forms the inner race for overrunning coupling 42. The outer race, shown at 214, is carried by the drum 180. Either rollers or sprags can be used to provide a one way braking action between the races 212 and 214.

The lower section of the housing portions 100 and 98 contain the final drive gearing 60 and the differential mechanism 78. The housing portion 100 is provided with an opening 216 in which is positioned bearing support 218. The support 218 is displaced substantially inwardly so that its inboard end is located as close to the forward wall 94 as possible. The inboard end is provided with an annular bearing ring 220 which provides one bearing support for output sprocket 68, the other support being provided at 222 preferably directly in the operating plane of the sprocket 68.

The parking gear for the transmission may be formed on the sprocket 68 as shown at 222.

The sun gear 66 for the final drive gearing 60 is splined to the inboard end of the output sprocket 68. The carrier 72 is connected directly to the carrier housing 224 for the differential mechanism 78. The inboard side of the differential mechanism 78 is supported as shown at 226 on the outboard sprocket 78, and the other side of the differential carrier 224 is supported as shown at 226 in an opening formed in the housing portion 98.

One side gear 80 is connected to the inboard end of one axle shaft 84 and the other side gear 82 is connected by a spline to the inboard end of the opposite axle shaft 86. Constant velocity universal joints, schematically shown at 228 and 230, connect the axle shafts 84 and 86, respectively, to the drive shafts for the vehicle traction wheels. The position of the drive sprockets and the above described means for positioning the final drive gearing 60 and the differential mechanism 78 generally in the operating plane of the converter make it feasible to use a transverse engine mounting in the vehicle without the necessity for using a foreshortened axle shaft and a large axle shaft angle at the universal joint 228.

Having described a preferred form of my invention, what I claims and desire to secure by U.S. Letters Patent is:

1. A four speed automatic overdrive transaxle for an engine powered vehicle comprising:
    a hydrokinetic unit having a bladed impeller connected to said engine and a bladed turbine;
    a compound planetary gear unit comprising a large sun gear, a small sun gear, a set of long planet pinions engaging said large sun gear, a set of short planet pinions engaging said small sun gear, said pinions being mounted on a carrier and engaging each other, and a ring gear engaging the long planet pinions;
    said planetary gear unit, said hydrokinetic unit and said engine being arranged on a first axis, a differential gear mechanism having torque output side gears adapted to be connected to paired axle shafts mounted for rotation about a second axis spaced laterally with respect to said first axis;
    a torque transfer drive mechanism disposed between said planetary gear unit and said hydrokinetic unit having a torque input element connected to said ring gear and a torque output element connected to the torque input side of said differential gear mechanism;
    first clutch means for connecting said turbine to said large sun gear during reverse drive, second clutch means for connecting said turbine to said small sun gear during operation in the first three forward drive ratios and third clutch means for connecting said impeller to said carrier during operation in overdrive, said first clutch means and said second clutch means each having friction discs located between said engine and said torque transfer drive mechanism, said first clutch means and said second clutch means each having an annular cylinder rotatably mounted for rotation about a common axis, said annular cylinders being in radially spaced dispersion, one with respect to the other;
    first brake means for braking the large sun gear during operation in the second underdrive ratio and during operation in overdrive and second brake means for braking said carrier during operation in the first underdrive ratio and during operation in overdrive;
    said first and second clutch means having a common turbine torque input element, said torque input element having an externally splined portion for carrying internally splined clutch discs of said first clutch means and an internally splined portion for carrying externally splined clutch discs of said second clutch means, said torque input element also defining an annular cylinder for said second clutch means;
    an annular piston in said cylinder engageable with the clutch discs of said second clutch means, the discs of said first clutch being located radially outward from the clutch discs of said second clutch means, a torque output element of said first clutch means extending radially between said second clutch means and the torque input element of said transfer drive mechanism;
    said second brake means being situated on the side of said planetary gear unit remote from said transfer drive mechanism in radially spaced relationship, one with respect to the other;
    said differential gear mechanism being located approximately in the transverse operating plane of said hydrokinetic unit, the latter being disposed between said engine and said first and second clutch means;
    said torque transfer drive mechanism comprising a final drive ring gear connected to a stationary housing portion for said transaxle;
    a final drive sun gear connected drivably to said ring gear;
    said torque output element of said torque transfer drive mechanism being a planetary carrier; and
    final drive pinions on said final drive carrier engaging said final drive sun gear and said final drive ring gear.

2. The combination as set forth in claim 1 wherein said torque transfer drive mechanism comprises a driven sprocket;
    said torque input element of said torque transfer drive mechanism being a driving sprocket; and
    a drive chain drivably connecting said driving and driven sprockets.

3. The combination as set forth in claim 2 wherein said second axis is laterally offset from and parallel to said first axis.

4. The combination as set forth in claim 2 wherein said transaxle comprises a housing having first, second and third housing portions spaced axially along said first axis;
    said first housing portion enclosing said hydrokinetic unit;
    said second housing portion being located between said first and said third housing portions and enclosing said first and said second clutch means; and
    said third housing portion enclosing said third clutch means and said second brake means.

5. The combination as set forth in claim 1 wherein said second axis is laterally offset from and parallel to said first axis.

6. The combination as set forth in claim 5 wherein said transaxle comprises a housing having first, second and third housing portions spaced axially along said first axis;

said first housing portion enclosing said hydrokinetic unit;

said second housing portion being located between said first and said third housing portions and enclosing said first and said second clutch means; and said third housing portion enclosing said third clutch means and said second brake means.

7. The combination as set forth in claim 1 wherein said transaxle comprises a housing having first, second and third housing portions spaced axially along said first axis;

said first housing portion enclosing said hydrokinetic unit;

said second housing portion being located between said first and third housing portions and enclosing said first and second clutch means; and said third housing portion enclosing said third clutch means and said second brake means.

* * * * *

UNITED STATES PATENT AND TRADEMARK OFFICE
CERTIFICATE OF CORRECTION

PATENT NO. : 4,346,622
DATED : August 31, 1982
INVENTOR(S) : Stanley L. Pierce

It is certified that error appears in the above-identified patent and that said Letters Patent are hereby corrected as shown below:

Claim 1, column 5, lines 65 and 66, delete "dispersion" and insert -- disposition --.

Signed and Sealed this

Seventeenth Day of May 1983

|SEAL|

*Attest:*

DONALD J. QUIGG

*Attesting Officer*   *Acting Commissioner of Patents and Trademarks*